United States Patent [19]
Kim et al.

[11] Patent Number: 5,793,883
[45] Date of Patent: Aug. 11, 1998

[54] METHOD FOR ENHANCING ULTRASOUND IMAGE

[75] Inventors: Jin H. Kim, Issaquah; Dong-Chyuan Liu, Mercer Island, both of Wash.

[73] Assignee: Siemens Medical Systems, Inc., Iselin, N.J.

[21] Appl. No.: 536,561

[22] Filed: Sep. 29, 1995

[51] Int. Cl.$^6$ .............................. G06K 9/00; G06K 9/40
[52] U.S. Cl. .................. 382/128; 382/254; 128/660.07; 128/660.05; 128/667.02
[58] Field of Search ................................ 382/128, 254, 382/263, 264, 266, 274; 348/163; 128/660.07, 660.05, 662.02

[56] References Cited

U.S. PATENT DOCUMENTS

| 5,040,225 | 8/1991 | Gouge | 382/128 |
| 5,513,640 | 5/1996 | Yamazaki et al. | 128/660.05 |
| 5,526,816 | 6/1996 | Arditi | 128/662.02 |
| 5,528,302 | 6/1996 | Basoglu et al. | 348/163 |

OTHER PUBLICATIONS

Geck et al., "A Simple Method to Modulate Ultrasonic Scans"; Ultrasound in Medicine, vol. 3b; 1977.
Bronson et al., "Real-Time Color B-Scan Ultrasonography"; Journal of Clinical Ultrasound, vol. 3, No. 3; 1975.
Bleck et al., "Artifact Resistant Gray Scale Windows in Clinical Ultrasound of the Liver"; Acoustic Imaging, vol. 19; 1992.
Balasubramanian et al.; "A New Approach to Palette Selection for Color Images;" Journal of Imaging Technology, vol. 17, No. 6, Dec. 1991.
Foley et al., "Transparency," Computer Graphics, pp. 754-758; Addison-Wesley, (1990).

*Primary Examiner*—Scott A. Rogers

[57] ABSTRACT

Ultrasound gray-scale image data and corresponding processed gray-scale image data are color-enhanced to generate an enhanced multi-color image. At one step, a color map look-up table is defined from the processed gray-scale image data to define a color palette of K colors, (e.g., K=4-16). Histogram analysis, nonlinear mapping or segmentation processing is used to map the gray-scale levels to the color palette. The processed gray-scale image data then is transposed into a transposed color image data set. Data interpolation then is performed in which each pixel of the original gray-scale image data is interpolated with a corresponding pixel among the transposed color image data set. Interpolation weighting is adjustable by the user to determine how much detail from the original gray scale image is preserved.

19 Claims, 5 Drawing Sheets

METHOD FOR ENHANCING ULTRASOUND IMAGE

BACKGROUND OF THE INVENTION

This invention relates generally to medical diagnostic ultrasound imaging methods, and more particularly to color display of B-mode images.

Medical diagnostic ultrasound systems generate images of anatomical structures within a patient's body by scanning a target area with ultrasound signals. Typically, ultrasound signals on the order of typically 3.0 MHz are transmitted into a patient. Returning echo signals then are formed into a beam-pattern and analyzed to convey image and/or flow characteristics of the scanned area.

A B-mode image is a brightness image in which component pixels are brightened in proportion to a corresponding echo signal strength. The brightness image represents a cross section of a patient target area through a transducer's scanning plane. Typically the B-mode image is a gray scale image in which the range of lighter to darker gray-scale shades correspond to increasing brightness or echo strength.

Conventionally, ultrasound color images have been generated for showing velocity or texture. For example, in many diagnostic applications, doppler information is displayed to show velocity or flow estimates of blood or fluids within a target area. Specifically, B-mode gray-scale images and color-coded velocity estimates are simultaneously displayed. The color-coded velocity estimates are spatially coordinated with and super-imposed on the B-mode image.

Some ultrasound systems have the ability to present differing echo intensities as differing colors, (as opposed to shades of gray). Because the human eye can differentiate more color tints than gray-scale shades, color displays can be adapted to improve contrast resolution. For example, it is known to display color B-mode images in which areas of different analyzed echoic textures are assigned predetermined colors. A shortcoming of such a prior method of displaying color B-mode images is that artifacts are introduced. One cause of artifacts is the large hue differentials in the resulting many-colored image. Another cause of artifacts is the assignment of colors to very small image portions. Because the human eye is physiologically unable to distinguish the color of very small objects, ambiguity (e.g., artifacts) appears among structural details of the target area.

Using a color map to improve image quality is disclosed by Bronson et al. in "Real-Time Color-Scan Ultrasonography," *Journal of Clinical Ultrasound*; Vol. 3, No. 3 (1975); and Geck et al. in "A Simple Method to Modulate Ultrasonic Scans," *Ultrasound in Medicine*; Vol. 3b (1977). Using colored adaptive look-up tables to control contrast and brightness of images is disclosed by Bleck et al. in "Artifact Resistant Gray Scale Windows in Clinical Ultrasound of the Liver," *Acoustic Imaging*, Vol. 19 (1992). Specifically, Bleck et al. use color to transform an original gray scale value to a chrominance value at each pixel.

This invention is directed toward the enhancement of ultrasound images, including gray-scale images and color images. Prior color imaging techniques for ultrasound echo data sacrifice detail to improve contrast. This invention is directed toward a method of preserving detail while improving contrast. A known technique for preserving some detail while improving contrast is to generate an image using a single color. Shades or red, for example, are used instead shades of gray. Use of the single color allows for improved detail. Use of red instead of gray allows for improved contrast. "Red-scale" images are known to improve image contrast by 10%-15% over corresponding gray-scale images. It is desirable, however, to further improve contrast while preserving image detail.

SUMMARY OF THE INVENTION

According to the invention, an enhanced multi-color image is derived from an original gray-scale image and a processed gray-scale image.

The original gray-scale image is derived conventionally by assigning gray-scale values to ultrasound echo intensity values. The processed gray-scale image is derived using conventional or other techniques. Conventionally, the processed gray-scale image is derived by processing original gray-scale image data to reduce speckle and enhance desired features, (e.g., using smoothing algorithms). The original (pre-processed) gray scale image data and the processed gray-scale image data are combined to generate the final enhanced multi-color image. By using original gray-scale image data the enhanced color image preserves fine-detail structures. By using processed gray-scale image data the multi-color image preserves desired image enhancement features.

According to the inventive method, a color-map look-up table is generated at one step; processed gray-scale values are transposed at another step; and data interpolation is performed at a final step.

According to one aspect of the invention, the color map look-up table is defined from initial processed gray-scale image data. According to various embodiments the color map look-up table includes K colors - (e.g., typically 4–16 colors, preferably 6–8 colors). For 8-bit display systems, the processed gray-scale image is derived using a scale of 256 shades of gray. This 256 gray-scale level is converted to a K color palette. To define the color map look-up table as a K color palette, the processed gray-scale image first is broken down into multiple blocks. A histogram analysis of intensity within each block then is performed to find a most prevalent intensity, (i.e., the histogram peak). The histogram peak corresponds to a local median intensity. For a processed gray-scale image divided into N blocks of m pixels by h pixels, N local median intensity values are achieved. Typically N is on the order of thousands.

The N local median intensity values undergo additional analysis to group the N values among multiple bins. In one embodiment, the user selects the number of bins, (i.e., the number of colors in the palette). Each bin represents one of the K colors. According to differing embodiments, histogram analysis, nonlinear mapping or segmentation processing is performed to define ranges for allocating the N local median intensity values into the K bins. The result is a basic color palette of K colors and a color map look-up table for converting from the 256 gray-scale level to the K color palette.

According to another aspect of the invention, the sum of color components for each color in the basic palette (e.g., RGB—red, green and blue primary colors) is a constant multiplied by a decay factor. The decay factor serves to improve contrast by controlling changes in brightness. Specifically, as the eye is more sensitive to variations in brightness than chromaticity, a decay factor, Y, is used in transposing brightness values. In one embodiment, the RGB components are written as (a+S, a, a−S), (a, a+S, a−S) and (a−S, a, a+S) where "a" is fixed intensity value, and S is the saturation constant set by the user. As a result, the sum of the maximum and minimum color components is a constant which gives the same lightness in HLS color space (i.e., hue, lightness, chromaticity color space color space).

According to another aspect of the invention, the three dominant color components, (a+S, a, a−S), (a, a+S,a−S) and (a−S, a, a+S) in RGB, order, are used to generate the K colors. The decay factor is applied to the components to achieve the K colors. In applying the decay factor the dominant color component (e.g., the R component, G component or B component) is shifted with a decreasing lightness as the colors k=1,K are assigned. As a result, the palette provides different colors with a minimal degree of colorfulness.

The color palette then is used to transpose image frames of processed gray-scale image data into transposed color image data.

According to another aspect of the invention, data interpolation is performed on the transposed color image data to re-introduce desired detail from the original gray-scale image data. To do so, each pixel of the original gray-scale image data is interpolated with a corresponding pixel of the transposed color image data. Interpolation weighting is adjustable by the user to determine how much detail is preserved. Specifically, the user selects a weighting factor, $\beta$.

According to another aspect of the invention, in implementing the interpolation step the selected weighting factor is adjusted as a function of the pixel values being interpolated. The weighting factor is adjusted so as to be smaller in image speckle areas. This provides improved perception of the displayed feature.

One advantage of the invention is that the use of multiple colors improves contrast. Another advantage is that the reduction in colors and the interpolation using original gray scale image data preserves a desired amount of image detail.

DESCRIPTION OF SPECIFIC EMBODIMENTS
Ultrasound Host Apparatus

Figure 1:
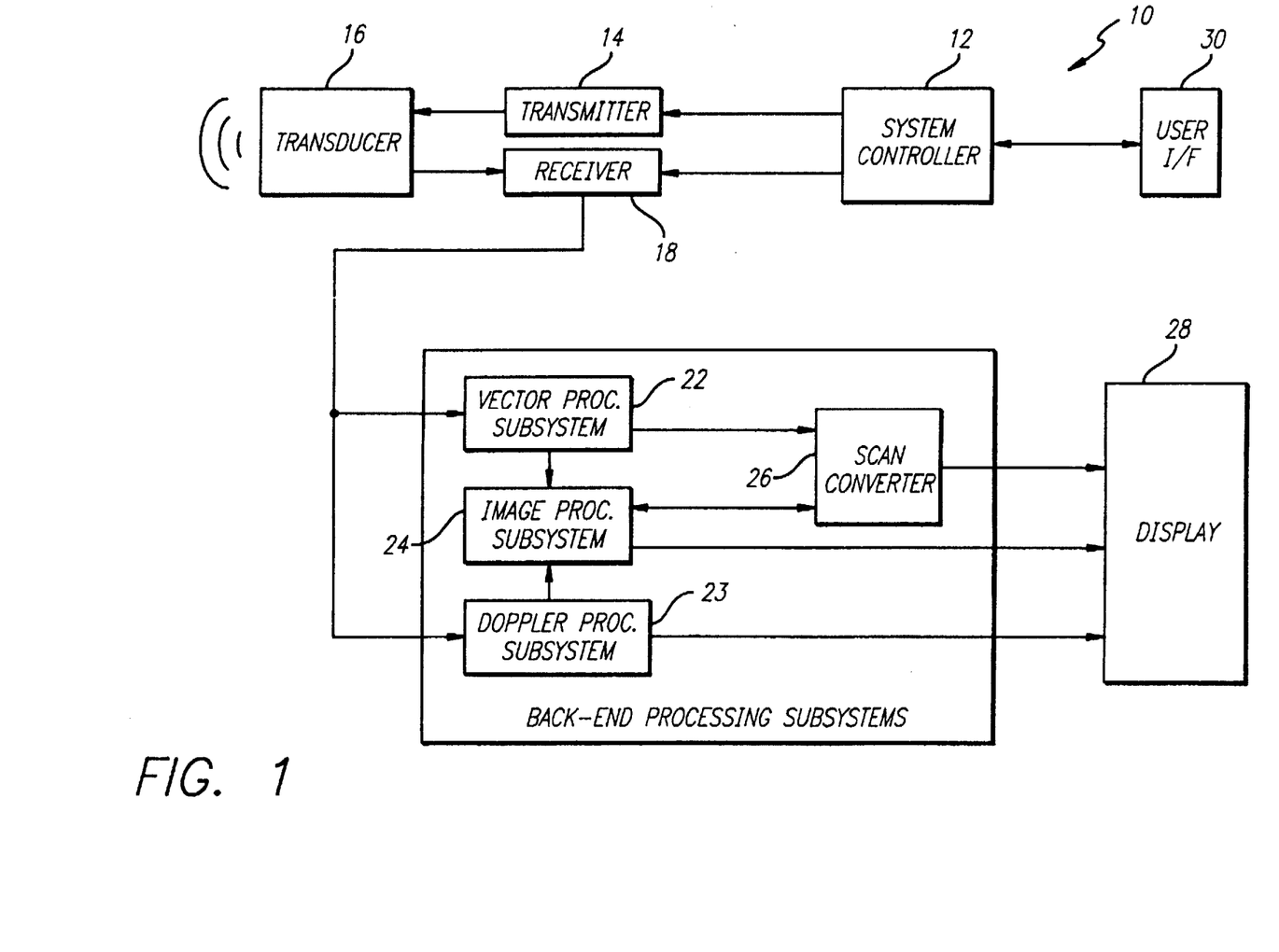
FIG. 1 is a block diagram of a medical diagnostic ultrasound system.

FIG. 1 shows an medical diagnostic imaging system 10. The system 10 emits ultrasound signals and detects response echoes to scan a target area within a patient's anatomy. The ultrasound system 10 includes a system controller 12, transmitter 14, transducer 16, receiver 18, vector processing subsystem(s) 22, doppler processing subsystem 23, image processing subsystem 24, scan converter 26 and display 28. The system controller 12 provides a user interface 30 (e.g., control panel, display menu, keyboard) and controls system operations. In operation, the system controller 12 triggers the transmitter 14 to generate electrical signals for output to the transducer 16. The transducer converts the electrical signals into an ultrasound transmit wave-pattern. Typically, the transducer is positioned adjacent to and in contact with a patient's anatomy. The transmit wave-pattern propagates into the patient's anatomy where it is refracted, absorbed, dispersed and reflected. The degree of refraction, absorption, dispersion and reflection depends on the uniformity, density and structure of the encountered anatomy. Of interest is the reflected components which propagate back to the transducer 16. These echoes are sensed by the transducer 16 and converted back into electrical signals. The electrical signals are input to a receiver which amplifies the signals. A beam-formed portion groups the echo signals into correlated frames of data scans over a given target area.

The raw beam-formed data is fed to back-end processing subsystems 22–26. The back-end processing subsystems typically perform echo processing, doppler processing, color flow processing, image processing, scan conversion and video processing.

Imaging Overview

Conventional image processing of raw beam-formed echo data includes generating gray-scale image data corresponding to a patient's target area. Typically, raw data is encoded by applying a gray-scale value proportional to the echo intensity for a given vector sample. Scan conversion is performed to fill in values for pixels between vector samples. This preliminary image data is referred to herein as the original, or pre-processed, gray-scale image data.

To improve contrast and enhance desired features of an image it is known to perform speckle reduction and image enhancement procedures. Generally, these are smoothing operations which remove a degree of detail from the image data in an effort to improve human-eye perception of desired features. In an exemplary process, contrast is improved at the expense of image detail.

Speckle reduction filters are well known. Image enhancement processes include enhancement filters and parametric imaging. For parametric imaging, a given parameter is processed to provide more clinical information to a user. For example, by estimating the local attenuation of an image, a user detects the degenerative plaque in an artery more easily than in a conventional gray-scale image. Other parameters include echo speed, signal variance, signal mean and other statistical parameters. The given enhancement process varies according to the user application. The result typically is a processed gray-scale image or a color-coded image. Conventionally, the processed gray-scale and color-coded images lose detail in the effort to improve a desired feature (e.g., improve image contrast). The object of this invention is to generate color images which improve the desired feature, yet preserve detail from the original gray-scale image data.

Figure 2:
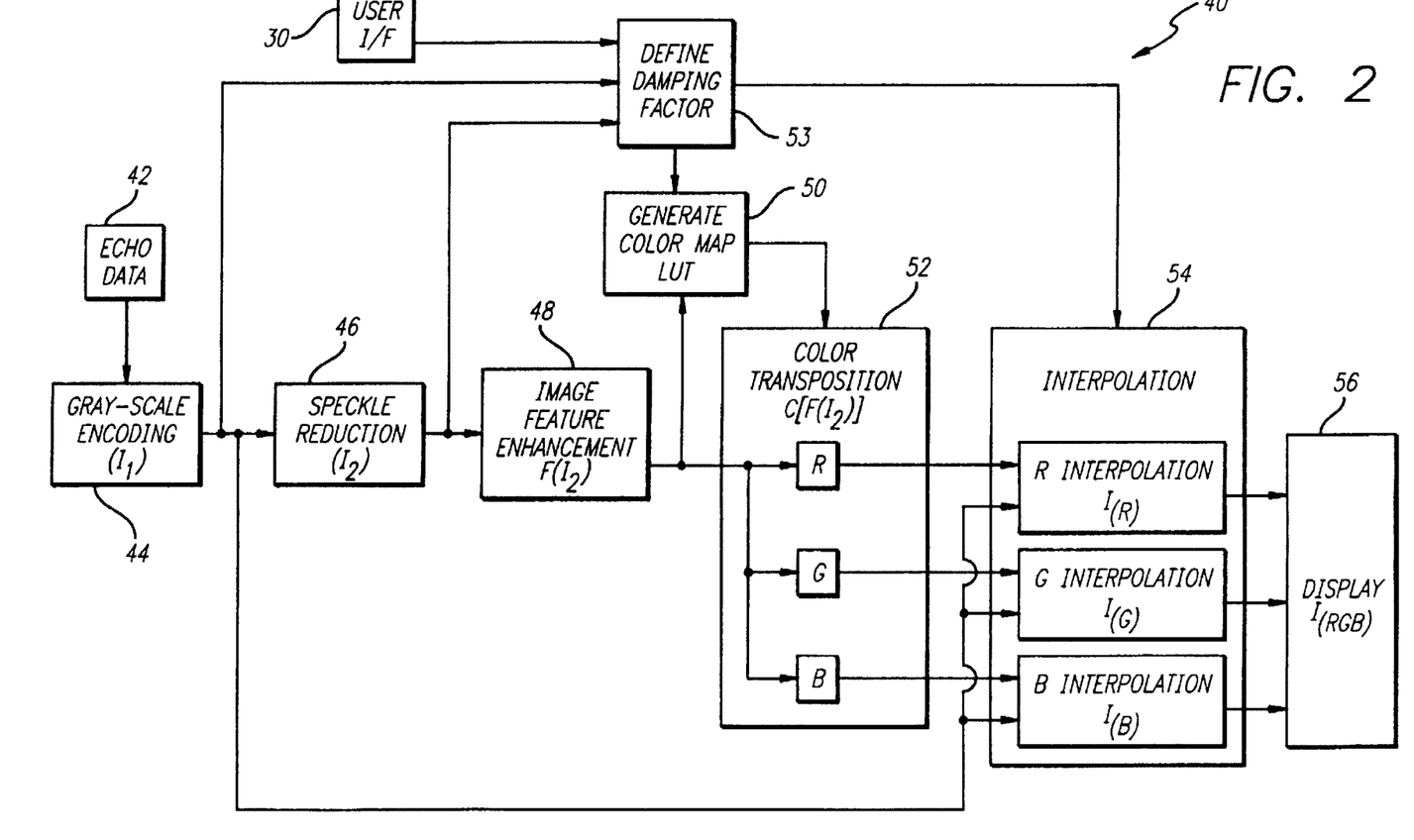
FIG. 2 is a functional flow diagram of a color image enhancing process according to an embodiment of this invention.

FIG. 2 is a functional block diagram of the color image enhancement process 40 according to an embodiment of this invention. The raw beam-formed echo data 42 is encoded and scan converted at step 44 to achieve the original gray-scale image data $I_1$, as described above. Such image data then is further processed at steps 46, 48 to reduce speckle and enhance a desired feature, also as described above. The speckle reduced image data is referred to as $I_2$. The processed gray-scale image data or color-coded image data as enhanced on a desired feature is referred to as $F(I_2)$, where F is the specific enhancement function (e.g., enhancement filtering or parametric imaging). The specific function F varies according to the user application.

The processed gray-scale image data $F(I_2)$ is used to generate a color-mapped look-up table (LUT) at step 50.

Thereafter during the current and subsequent frames, the color look-up table is used to transpose the processed gray-scale image data at step 52 into a set of reduced-color image data, C|F(I₂) |. In generating the color map look-up table a weighting factor is defined at step 53. The weighting factor is based upon a user input via I/F 30. In some embodiments, the weighting factor as applied to a given pixel varies from the user selected value as a function of the corresponding gray-scale image data value and speckle-reduced image data value.

At step 54, the reduced-color image data and original gray-scale image data are interpolated to generate pixel values for a final enhanced color image. Further image processing is performed as desired by the user in some embodiments. Ultimately, an image is stored in memory and/or displayed at display 56.

Following are detailed sections covering the step 50 of generating the color map look-up table, the step 52 of transposing processed gray-scale image data into transposed color image data, and the step 54 of interpolating data. The image enhancement process 40 is represented below:

$$I_{(RGB)} = [1 - \beta(I_1(p), I_2(p))] * I_1 + \beta(I_1(p), I_2(p)) * C[F(I_2(p))]$$

where, $I_{(RGB)}$=enhanced multi-color image data;

$I_1$=gray-scale encoded image data;

$I_2$=speckle-reduced image data;

p=specific pixel among image data;

β=user-selected weighting factor, (i.e., transmission coefficient);

β($I_1$(p),$I_2$(p))=weighting factor as adjusted for respective brightness of current pixels in $I_1$ and $I_2$;

F($I_2$)=Feature-enhanced processed gray-scale image;

C[F($I_x$)]=transposed multi-color image.

Color Map Look-Up Table

The color-map look-up table (LUT) is derived from the gray-scale levels of the processed gray-scale image data. Typical medical ultrasound imaging systems use 8-bit schemes (i.e., $2^8$=256 gray-scale levels), although lesser or more gray-scale levels also are used. In one embodiment the color map LUT is derived by remapping the 256 gray-scale levels to a set of RGB combinations. To do so predominant intensities in the processed gray-scale image are identified and mapped to colors of a basic color palette. The user selects the number of colors, K, in this basic color palette. Typical values for K are 4–16 colors. In preferred embodiments the user selects K to be 6, 7 or 8 colors. Using a small number of basic colors (e.g., 4–16) is preferred because it enhances color transparency effects, as if overlaying the original gray-scale image with the color-coded image.

Basic Color Palette:

In defining the K colors for the basic color palette, several criteria are used. First, the three components (e.g., Red, Green and Blue primary color components) for each basic color are less than their corresponding components for of the maximum gray-scale level. Thus, for a 256-level gray-scale (e.g., 0–255), the three components for any basic color should be less than those of level 255.

Second, all neighboring colors k and k+1 in the basic color palette differ enough to allow the human eye to perceive a significant depth-disparity effect.

Third, the sum of color components for a given color k are a constant multiplied by a decay factor allowing easy control over changes into brightness. Because the human eye is more sensitive to variations in brightness than chromaticity, using a decay factor over increasing brightness enables improved contrast by the human eye.

The first criteria is met by writing the three color components for each color k as combinations of (a+S, a, a−S), (a, a+S, a−S), and (a−S, a, a+S), where "a" is a fixed color intensity value, and S is a select saturation value set by the user. As a result, the sum of the maximum and minimum RGB components is a constant which gives the same lightness in HLS color space, (i.e., Hue, Lightness, Saturation color space). Specifically, lightness is given by L=0.5 ($I_{max}$ + $I_{min}$), where $I_{max}$ and $I_{min}$ denote the maximum and minimum RGB components, respectively.

The second criteria is met by having the dominant color component shifted as k goes from 0 to K-1. The dominant color component shifts from R at one color, then G at the next color, then B at the next color, then back to R at the next color, and so on.

The third criteria is met by setting "a" in one embodiment to the highest color value of the color-coded palette (e.g., 255) and accepting user-defined parameters for the saturation (S) and the decay factor ($Y_0$). The K colors then are, for K=8:

$k_0 = Y^{(0)}$(a+S, a, a−S)
$k_1 = Y^{(1)}$(a, a+S, a−S)
$k_2 = Y^{(2)}$(a−S, a, a+S)
$k_3 = Y^{(3)}$(a+S, a, a−S)
$k_4 = Y^{(4)}$(a, a+S, a−S)
$k_5 = Y^{(5)}$(a−S, a, a+S)
$k_6 = Y^{(6)}$(a+S, a, a−S)
$k_7 = Y^{(7)}$(a, a+S, a−S)

Further to assure that a positive color component occurs, $(I_M-S) * Y^k_0 - S \leq 0$, and $0 \leq k < K$, where $I_M$ is the maximum intensity value in the gray-scale range. Thus, given the user-selected parameters, the lightness of the processed gray-scale image determines the K basic colors.

However, to improve contrast in darker regions of the final multi-color image I(RGB), the decay factor varies depending on which of the K basic colors is called for. For example, for a color $0 \leq k \leq K/2$, the decay factor, $Y^{(k)}$, is $Y^{(k)}_0$, (e.g., the user-selected value). For a color n/2<k $\leq$ K, the decay factor, $Y^{(k)}$, is $Y^{(K-k)}$.

Figure 3:
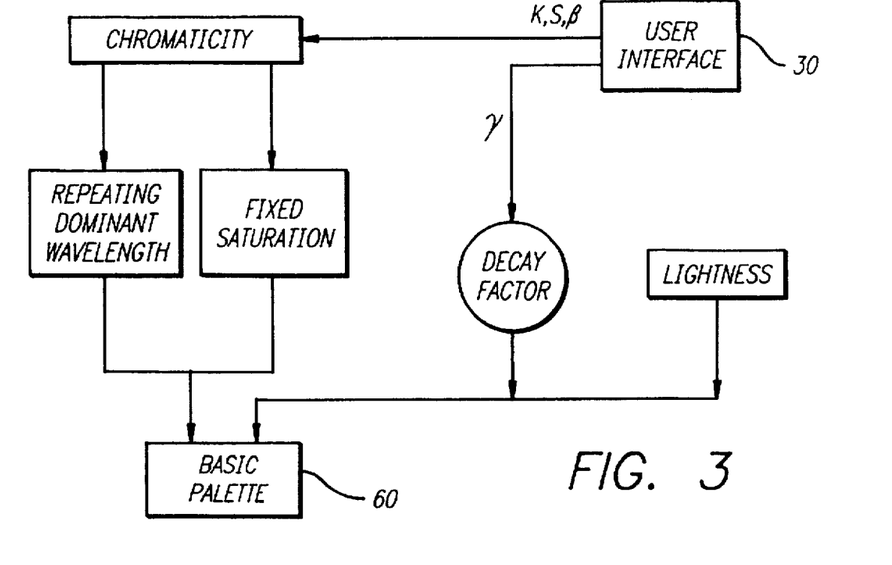
FIG. 3 is a functional block diagram of a step for generating a basic color palette according to an embodiment of this invention.

FIG. 3 shows a functional flow diagram of the basic palette selection process. The user defines the saturation value, S, the number of colors, K, the weighting factor, β, and the decay factor, Y. The values S, K and β determine a constant chromaticity. The chromaticity is broken down based on the local median intensity. The decay factor is applied to the lightness component. The result is a basic RGB palette 60 of K colors.

Figures 4, 5:
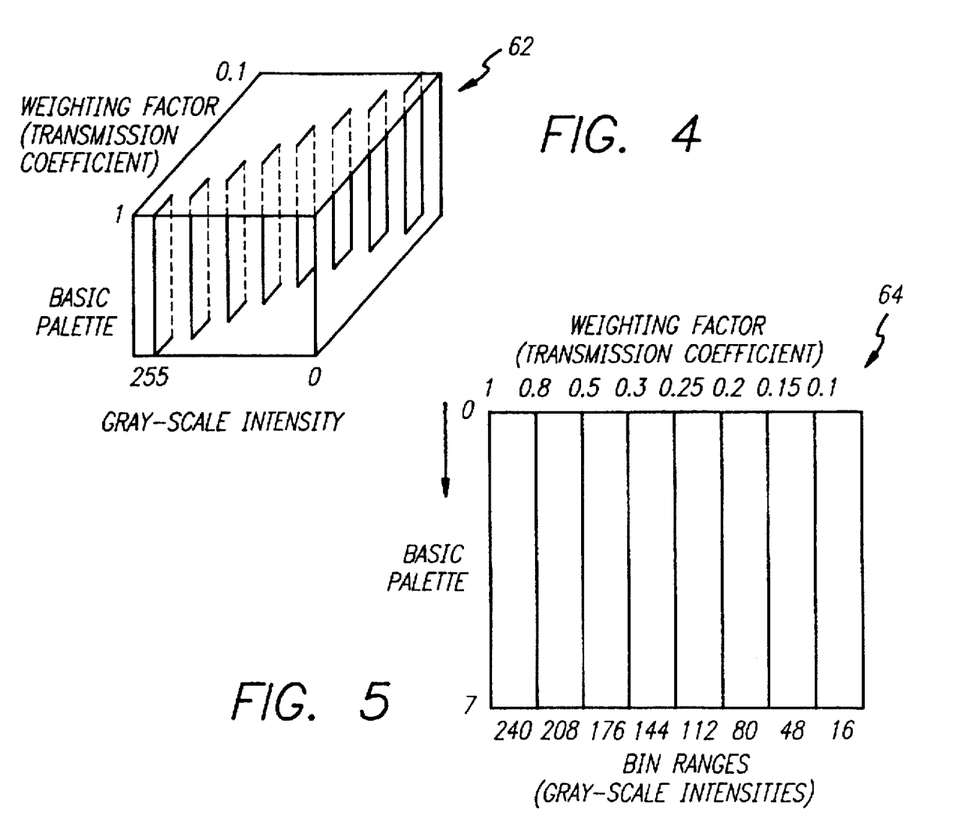
FIG. 4 is a 3-dimensional color box for visualizing the color map look-up table according to an embodiment of this invention.
FIG. 5 is a 2-dimensional diagonal slice of the color box of FIG. 4 depicting a specific color map look-up table embodiment.

FIG. 4 depicts a 3-dimensional color box 62 showing that the basic color palette 60 is expanded to define colors for the final multi-color image. The color box 62 has the basic palette spectrum along one axis, the gray-scale intensity levels along another axis, and the weighting factors, (e.g., β ($I_1$, $I_2$)) along a third axis.

FIG. 5 shows a 2-dimensional diagonal slice of the 3-dimensional color box 62 embodying a color map look-up table 64 according to an exemplary embodiment of this invention. The displayed color is the basic palette color modified based upon the weighting factor.

Color Mapping:

The gray-scale levels of the processed gray-scale image are mapped to the basic color palette 60 by range. Specifically, each color in the basic palette is the transposition for a range of gray-scale levels in the processed gray-scale image. Assigning the ranges to each basic color, (also referred to herein as a "bin"), is determined using any of histogram, nonlinear mapping or segmentation processing.

Figure 6:
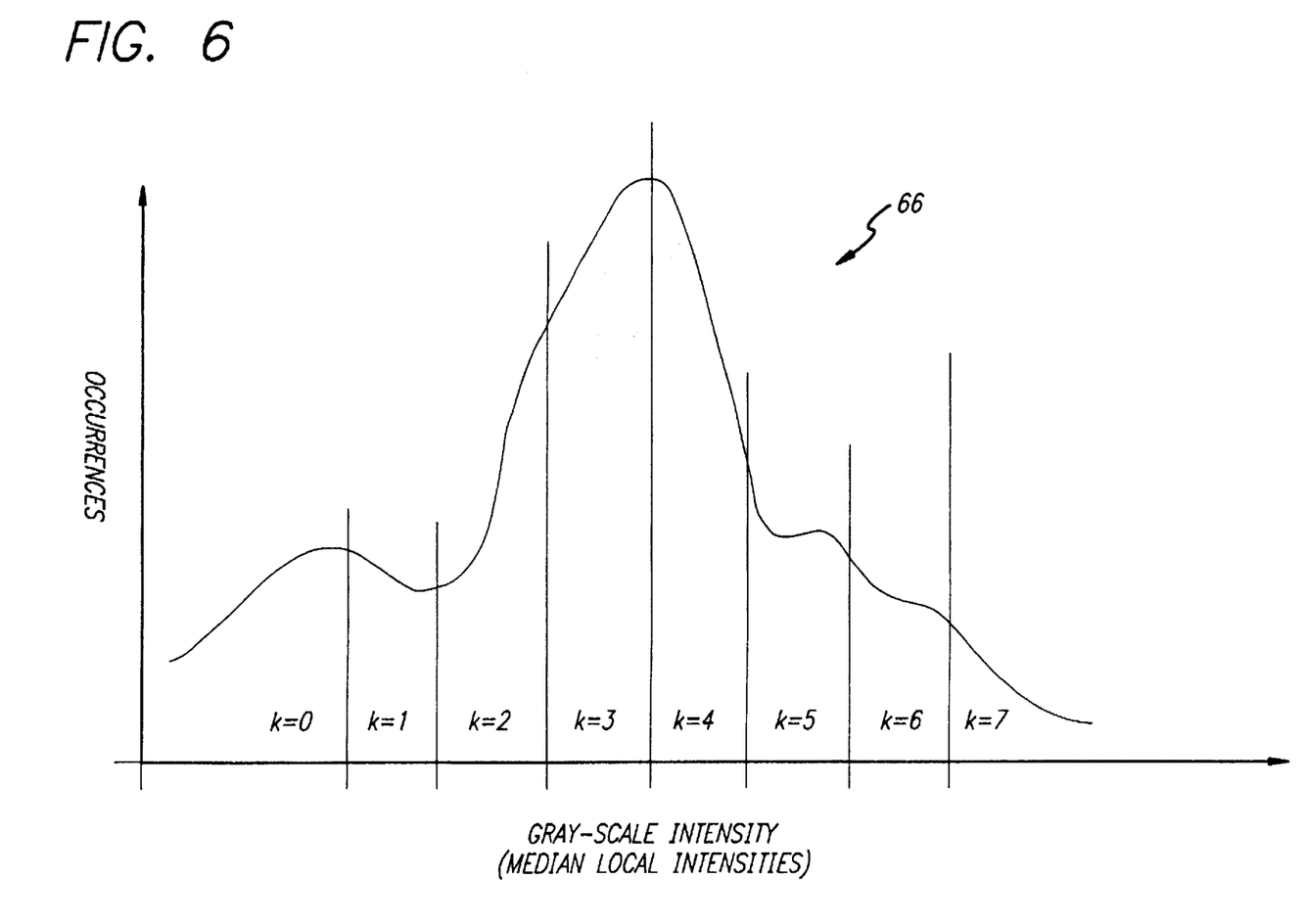
FIG. 6 is a histogram of local median color intensities allocated among K-8 colors.

For an embodiment implementing a histogram, the colors for each pixel in an initial processed gray-scale image, $F(I_2)$, are tallied to define a histogram of intensities. The histogram includes a range of gray-scale intensities and occurrences for pixel intensities within such range. Opposing end colors along the K color spectrum are assigned to end regions of the histogram. The end regions are defined, for example, as 0.5 and 1.5 times the global dominant intensity of the histogram. Factors other than 0.5 and 1.5 are used in other embodiments. The remaining cut-off points then are defined by defining K-2 equidistant intervals between the end points. Note that the narrower the interval, the larger the variety of color to be observed. FIG. 6 shows an exemplary histogram 66 divided into 8 sections along the x-axis. Each color is assigned a range along the x-axis. Each range corresponds to a range of gray-scale intensities.

For nonlinear mapping a sigmoid function is used in an exemplary embodiment to control contrast and brightness, interactively.

For a segmentation processing embodiment, the color-coded image is divided into blocks. Each block is analyzed to identify a local dominant intensity. The local median intensities then are analyzed to assign gray-scale level ranges to the bins for the basic color palette.

According to one embodiment, the predominant intensities in an image are determined by grouping the processed gray-scale image data, $F(I_2)$, into blocks of pixels. Each block includes m pixels by h pixels. The values of m and h may vary. An exemplary value is m=h=7. For such embodiment, 7×7=49 pixels are evaluated to find a local median intensity, (i.e., most dominant intensity). Histogram analysis, for example, yields a peak value as the local dominant (e.g., median) intensity for a given block.

The peaks for each block then are compared. The number of blocks for the processed gray-scale image varies according to (i) the values for m and h, and (ii) the resolution of the display monitor. Typically, the processed gray-scale image is broke down into thousands of blocks. Thus, there are thousands of peaks (local median intensities) to compare.

Figure 7:
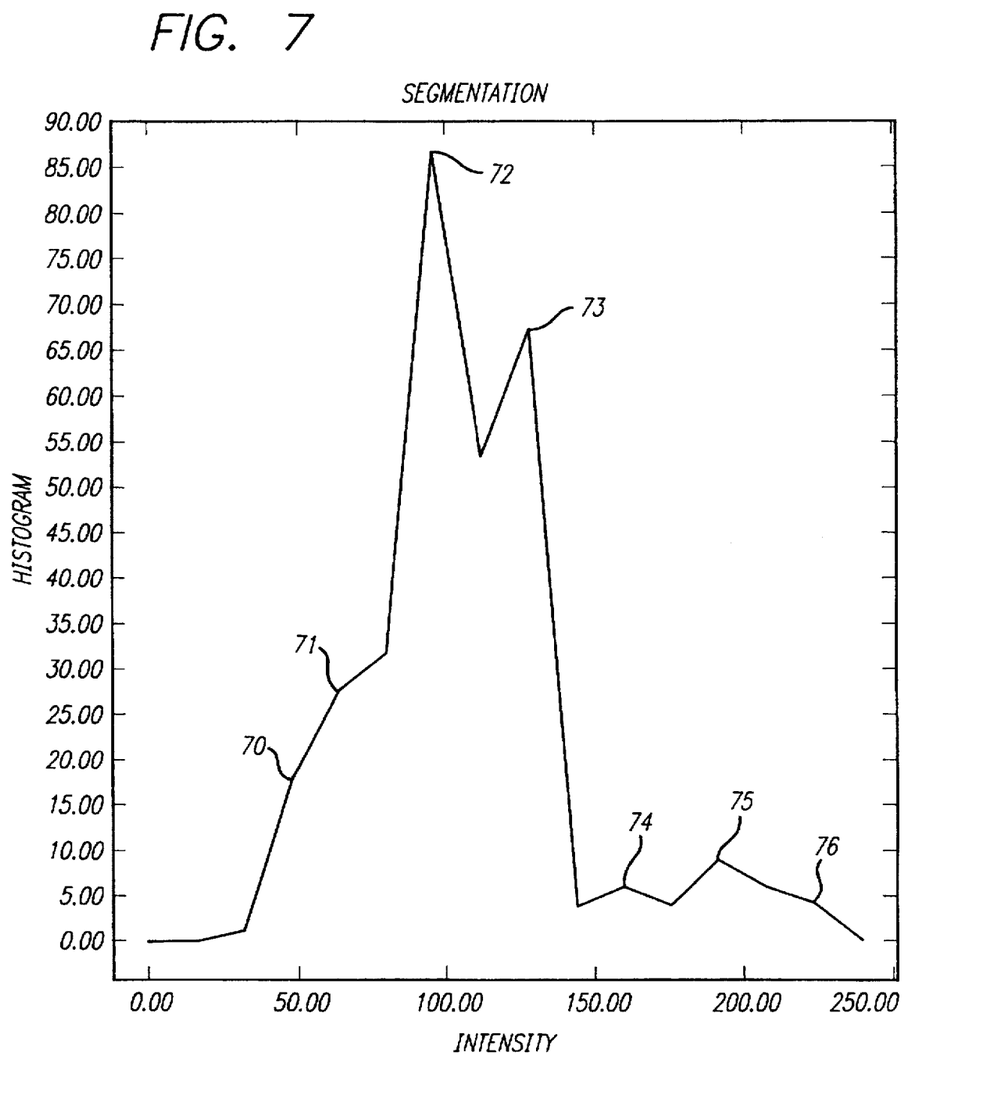
FIG. 7 is a histogram of local median color intensities in a sample color-coded image.

These thousands of peaks are processed in histogram fashion. FIG. 7 shows a histogram of local median intensities. As shown the histogram has several local maxima 70-76. The most dominant intensity among the thousands of peaks is the global maxima 72. This intensity range corresponds to the image background texture. Thus, a neutral color is preferable for a mid-scale color wavelength in the basic color palette. For the segmentation processing embodiment, the histogram of local median intensities is segmented to allocate gray-scale levels into color bins. For example, up to K local maxima are selected with ranges about the local maxima selected to defines the ranges for each color bin. Alternatively, K-2 local maxima are selected with ranges about the local maxima selected to define the ranges for K-2 bins. The remaining two bins have ranges starting from the respective endpoints of the histogram. In another embodiment a cumulative distribution function is applied to define the bin ranges.

The resulting color map LUT resembles the 2-dimensional diagonal slice of FIG. 5, although the discrete range values (bins) along the intensity axis vary and the corresponding weighting factors also vary.

The color map LUT 64 is defined for an initial processed gray-scale image, then used for transposition and interpolation of images and image data frames. In one embodiment the color map LUT continues unchanged until the user resets the image parameters, K, S, and/or β. Each time the user resets any of such parameters, the color map LUT 64 is recalculated. Additionally, the user can reset the parameters without changing values to recalculate the color map LUT based on the current or ensuing processed gray-scale image data.

Color Transposition

With the color map LUT 64 defined, the processed gray-scale data, $F(I_2)$, for a given frame is transposed at step 52 (see FIG. 2). To do so, the intensity value for each pixel of $F(I_2)$ is mapped to the color map LUT 64. The result is an R, G and B component for each pixel. Together the components for each pixel comprise a reduced color data set, $C[F(I_2)]$. The transposition occurs for each subsequent frame of beam-formed data.

Image Data Interpolation

At step 54 (See FIG. 2©), the R, G and B component of each pixel of the transposed color image data, $C[F(I_2)]$, are interpolated with corresponding pixel data from the original gray-scale image data, $I_1$. A weighting factor, β, is applied, where $\beta_0$ is the user-selected weighting factor. In one embodiment the weighting factor is a constant, $\beta_0$. In other embodiments, the weighting factor is a function of the pixel intensities being interpolated, (i.e., $\beta(I_1,I_2)$). Such function is a step function in one embodiment, a linear function in another embodiment, and a nonlinear function in yet another embodiment.

Equations (i), (ii), (iii) below show the interpolation functions for each of the red, green and blue components of a given multi-colored image pixel:

$$I_{(R)} = [1-\beta(I_1,I_2)]*I_{1(R)} + \beta(I_1,I_2)*C[F(I_2)]_{(R)} \quad (i)$$

$$I_{(G)} = [1-\beta(I_1,I_2)]*I_{1(G)} + \beta(I_1,I_2)*C[F(I_2)]_{(G)} \quad (ii)$$

$$I_{(B)} = [1-\beta(I_1,I_2)]*I_{1(B)} + \beta(I_1,I_2)*C[F(I_2)]_{(B)} \quad (iii)$$

$I_{(R)}$, $I_{(G)}$, $I_{(B)}$ are the red, green and blue component signals for a given pixel of the final enhanced multi-color image. The component signals are output to define a color at a corresponding pixel of display 56. The stream of signals for all pixels defines the final enhanced multi-color image generated at display 56.

Alternative Embodiments

Although the color-map LUT table is derived from gray-scale levels in the preferred embodiment, in other embodiments the color-map LUT is derived from a large color palette. For example, when the original gray-scale image is processed to enhance a feature, the result may be a colorized image. Such colorized image is defined using a color palette. Eight-bit color systems typically define a palette of 256 colors. Systems with up to 24-bit color are used in the computer and printing fields. Such systems have an even larger palette. According to an embodiment of this invention, the 256 color palette or larger palette is transposed into a K color palette based on the steps described above (i.e., identifying local median intensities and mapping ranges to each of the K colors).

What is claimed is:

1. A method of generating an ultrasound multi-color image from beam-formed echo data of a target area, comprising the steps of:

generating a first set of gray-scale image data from the beam-formed echo data;

filtering the first set of gray-scale image data to reduce speckling and enhancing a desired imaging feature to achieve a second set of image data from the first set;

transposing the second set into a third set of multi-color image data using a color palette of K colors;

interpolating each pixel of the first set with a corresponding pixel of the third set using a weighting factor to derive a pixel signal for the multi-color image.

2. The method of claim 1, in which the weighting factor is selected by a user of an ultrasound diagnostic imaging system embodying the method.

3. The method of claim 1, in which the weighting factor is a function of intensity of the first set pixel and third set pixel being interpolated.

4. The method of claim 1, in which respective colors of the color palette are mapped to respective intensity value ranges of the second set.

5. A method of defining a color map look-up table for use in generating an ultrasound multi-color image from beam-formed echo data of a target area, comprising the steps of:

generating a first set of gray-scale image data from the beam-formed echo data;

filtering the first set of gray-scale image data to reduce speckling and enhancing a desired imaging feature to achieve a second set of image data from the first set, the second set defined from a domain of intensity levels; and mapping the domain to a color palette of not more than 16 colors.

6. The method of claim 5, in which each color of the color palette is derived from a combination of (a+S, a, a−S), (a, a+S, a−S), and (a−S, a, a+S) signal components, where "a" is an intensity level from the domain and S is a select saturation value.

7. The method of claim 6, in which each color of the color palette has a dominant color component among red, green and blue primary color components, and in which the dominant color component of a given color shifts in a fixed order among the red component, green component and blue component as the given color varies along a spectrum of the color palette.

8. The method of claim 7, in which "a" is the highest intensity level of the domain and the color palette comprises the following colors, $k_0$ to $k_5$, where $k_0 = Y^{(0)}(a+S, a, a-S)$ $k_1 = Y^{(1)}(a, a+S, a-S)$ $k_2 = Y^{(2)}(a-S, a, a+S)$ $k_3 = Y^{(3)}(a+S, a, a-S)$ $k_4 = Y^{(4)}(a, a+S, a-S)$ $k_5 = Y^{(5)}(a-S, a, a+S)$ and where $Y^{(0)}$, $Y^{(1)}$, $Y^{(2)}$, $Y^{(3)}$, $Y^{(4)}$, and $Y^{(5)}$ are decay factors for the respective colors $k_0$ to $k_5$.

9. The method of claim 8, in which the color palette further comprises:

$k_6 = Y^{(6)}(a+S, a, a-S)$ $k_7 = Y^{(7)}(a, a+S, a-S)$ where $Y^{(6)}$ and $Y^{(7)}$ are decay factors for the respective colors $k_6$ and $k_7$.

10. The method of claim 8, in which the respective decay factors are equal.

11. The method of claim 8, in which the respective decay factors vary according to a step function of the colors $k_0$ to $k_5$.

12. The method of claim 5, further comprising the step of assigning each intensity level of the domain to a color of the color palette by allocating respective multiple contiguous groups of intensity levels to respective colors of the color palette.

13. The method of claim 12, in which the step of assigning comprises:

identifying a local median intensity level for each one of thousands of pixel blocks defined by subsets of the second set;

tracking occurrences of identified local median intensity levels; and allocating the tracked occurrences into K groups, where K is the number of colors in the color palette.

14. The method of claim 13, further comprising the step of mapping each pixel of the second set to the color palette to achieve a third set of color image data.

15. The method of claim 14, further comprising the step of interpolating each pixel of the first set with a corresponding pixel of the third set using a weighting factor.

16. The method of claim 15, in which the weighting factor is selected by a user of an ultrasound diagnostic imaging system embodying the method.

17. The method of claim 15, in which the weighting factor is a function of intensity of the first set pixel and third set pixel being interpolated.

18. The method of claim 5, in which the domain comprises a set of gray-scale intensity levels.

19. The method of claim 5, in which the color palette is a first color palette and the domain comprises color intensity levels which define a second color palette, the second color palette larger than the first color palette.

* * * * *